United States Patent
Mehler

(10) Patent No.: US 8,914,983 B2
(45) Date of Patent: Dec. 23, 2014

(54) MEASURING AND TESTING DEVICE HAVING SEGMENTED THREADS AND THREAD SEGMENTS ADJUSTABLE WITH RESPECT TO EACH OTHER

(75) Inventor: Juergen Mehler, Bruchmuehlbach-Miesau (DE)

(73) Assignee: Robert Bosch GmbH, Stuttgart (DE)

( * ) Notice: Subject to any disclaimer, the term of this patent is extended or adjusted under 35 U.S.C. 154(b) by 341 days.

(21) Appl. No.: 13/510,367

(22) PCT Filed: Nov. 9, 2010

(86) PCT No.: PCT/EP2010/067132
§ 371 (c)(1),
(2), (4) Date: Aug. 6, 2012

(87) PCT Pub. No.: WO2011/061098
PCT Pub. Date: May 26, 2011

(65) Prior Publication Data
US 2013/0118018 A1     May 16, 2013

(30) Foreign Application Priority Data

Nov. 17, 2009   (DE) .......................... 10 2009 046 744

(51) Int. Cl.
*G01B 3/48* (2006.01)
*G01B 3/40* (2006.01)
*G01B 3/52* (2006.01)

(52) U.S. Cl.
CPC .. *G01B 3/40* (2013.01); *G01B 3/48* (2013.01); *G01B 3/52* (2013.01)
USPC ..................................... 33/199 R; 33/501.19

(58) Field of Classification Search
USPC ................ 33/199 R, 501.19, 501.08, 501.09, 33/501.7, 501.11, 501.12
See application file for complete search history.

(56) References Cited

U.S. PATENT DOCUMENTS

| | | | |
|---|---|---|---|
| 1,161,406 A | | 11/1915 | Nilson |
| 1,961,647 A | * | 6/1934 | Sonoda ........................ 33/199 R |
| 2,214,633 A | * | 9/1940 | Dillon ......................... 33/199 R |
| 2,412,781 A | * | 12/1946 | Parr ............................ 33/199 R |
| 2,883,760 A | * | 4/1959 | Eriksson ..................... 33/199 R |
| 3,270,427 A | * | 9/1966 | Johnson ...................... 33/199 R |
| 3,859,730 A | * | 1/1975 | Johnson ...................... 33/199 R |

(Continued)

FOREIGN PATENT DOCUMENTS

| | | |
|---|---|---|
| CN | 2062432 | 9/1990 |
| DE | 934211 | 10/1955 |
| DE | 19527738 | 4/1997 |

OTHER PUBLICATIONS

PCT/EP2010/067132 International Search Report dated Feb. 28, 2011 (Translation and Original, 4 pages).

*Primary Examiner* — Christopher Fulton
(74) *Attorney, Agent, or Firm* — Michael Best & Friedrich LLP

(57) ABSTRACT

The invention relates to a measuring and/or testing device (1) comprising a segmented thread (2) having thread segments (3 to 6). A first thread segment (3) and a second thread segment (4) of the segmented thread (2) are adjustable with respect to each other.

18 Claims, 2 Drawing Sheets

(56) References Cited

U.S. PATENT DOCUMENTS

| | | | | |
|---|---|---|---|---|
| 3,983,633 A * | 10/1976 | Kaifesh | | 33/199 R |
| 4,253,488 A * | 3/1981 | Leverberg | | 137/382 |
| 4,417,402 A * | 11/1983 | Hattan | | 33/199 R |
| 4,934,059 A * | 6/1990 | Green | | 33/199 R |
| 5,020,230 A * | 6/1991 | Greenslade | | 33/199 R |
| 5,199,175 A * | 4/1993 | Green | | 33/199 R |
| 7,934,415 B2 * | 5/2011 | Smida et al. | | 73/37 |

* cited by examiner

MEASURING AND TESTING DEVICE HAVING SEGMENTED THREADS AND THREAD SEGMENTS ADJUSTABLE WITH RESPECT TO EACH OTHER

BACKGROUND OF THE INVENTION

The invention relates to the area of measuring and testing devices. The invention specifically relates to the area of measuring and testing devices, which serve to check positional tolerances such as coaxiality, axial run-out or angle of thread.

It is conceivable that a measuring or testing device having one thread is screwed into a corresponding mating thread. There is however the problem in this connection that a certain amount of play exists due to the thread tolerance. In order to achieve a backlash-free accommodation of the thread of the measuring and testing device by the mating thread, it is conceivable for a tapered thread or a thread having pitch errors to be provided on said measuring and testing device. This has however the disadvantage that in so doing a measurement system analysis and a gage repeatability cannot be achieved.

SUMMARY OF THE INVENTION

The measuring and/or testing device according to the invention has in contrast the advantage that a backlash-free fixing of said measuring and/or testing device on a mating thread is possible, wherein a measurement system analysis and a gage repeatability is achieved.

It is advantageous for the first thread segment and the second thread segment to be at least approximately adjustable with respect to each other along a longitudinal axis. In so doing, a locking of the measuring and/or testing device on the mating thread is possible. An accommodation of the segmented thread in the mating thread, which is free from backlash and distortion, is thereby possible. This locking of said measuring and/or testing device in the desired position can be arbitrarily repeated. A measurement systems analysis is thereby provided.

The segmented thread is advantageously configured as a segmented external thread. Based on certain levels, positional tolerances such as coaxiality, axial run-out and angle of thread, which comprises internal and external thread, can then be tested on the object being examined with the measuring and/or testing device. A plurality of work pieces can thereby be tested, wherein it is possible to lock the measuring and/or testing device in a certain position. In so doing, the measuring and/or testing device can serve as a gage. In a corresponding manner, the segmented thread can however also be configured as a segmented internal thread.

It is advantageous for a guide tube to be provided, for the first thread segment to be configured on the guide tube, for a retaining body to be provided, which is fed into a guide bore of the guide tube along the longitudinal axis, and for the second thread segment to be configured on the retaining body. Said retaining body is thereby guided in an advantageous manner in the guide tube, wherein a guidance that is almost free of play is possible.

In this connection, it is further advantageous for the guide tube to have at least one recess and at least one further thread segment, which is separated from the first thread segment by the recess, for the retaining body to have at least one further thread segment and for the thread segments of the retaining body to be disposed in said recess of the guide tube. It is particularly advantageous for said thread segments of said retaining body to be disposed on a thread section of said retaining body which extends into the recess or respectively recesses of said guide tube. In order to manufacture the segmented thread, said retaining body can be positioned and locked in said guide tube, such that the thread section of said retaining body is disposed in a stroke central position of the retaining body. A grinding of the thread can then take place in this locked and assembled state.

It is further advantageous for a locking mechanism to be provided, which facilitates an adjustment of the first thread segment relative to the second thread segment. In addition, it is advantageous for the locking mechanism to have a resilient element, which on the one hand is at least indirectly supported on the guide tube and on the other is at least indirectly supported on the retaining body. It is furthermore advantageous here for the resilient element to apply a preload force to said retaining body with respect to said guide tube, said preload force acting approximately along a longitudinal axis. By actuating the locking mechanism, said retaining body can therefore be released or respectively locked in the guide bore of said guide tube. It is thereby particularly advantageous for a displacement of said retaining body to be facilitated by actuating the locking mechanism such that the lock is released. In the non-actuated state of said locking mechanism, the locking of said retaining body is always ensured.

It is however also possible for the locking mechanism to advantageously have a clamping nut or a clamping screw, which facilitates an adjustment of the first thread segment relative to the second thread segment. It is particularly advantageous for a clamping thread to be configured on the retaining body, which works together with the clamping nut, and for said clamping nut to be supported on an end face of the guide tube. By tightening said clamping nut or said clamping screw, the retaining body can thereby be locked in said guide tube. By loosening said clamping nut or clamping screw, a resetting is then possible in order to adjust or remove the measuring and or testing device.

A measuring and/or testing element of the measuring and/or testing device can be inserted in an advantageous manner in a receiving bore of the retaining tube. A modular design is hereby possible so that different measuring and/or testing elements can be used.

BRIEF DESCRIPTION OF THE DRAWINGS

Preferred exemplary embodiments of the invention are explained in detail in the following description with the aid of the accompanying drawings, in which corresponding elements are denoted with matching reference numerals. The following are shown.

DETAILED DESCRIPTION

Figure 1:
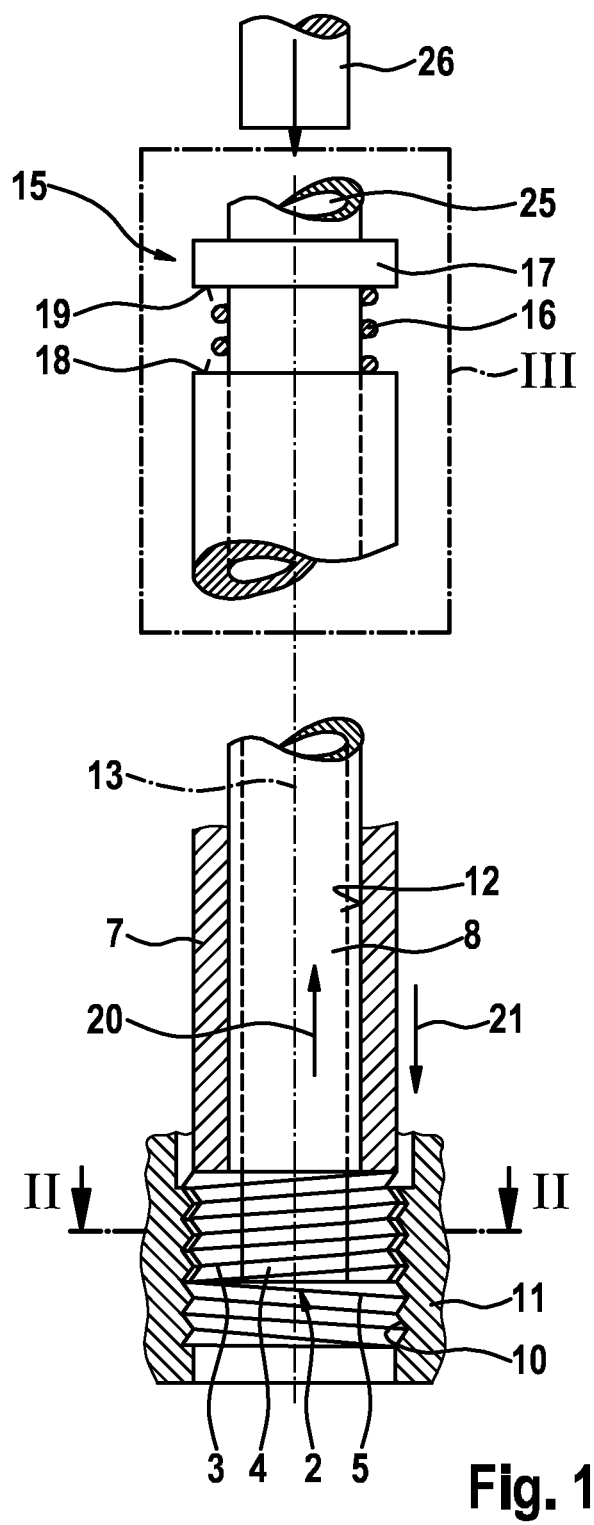
FIG. 1 a measuring and/or testing device in a schematic, partially sectional representation according to a first exemplary embodiment of the invention.

FIG. 1 shows a measuring and/or testing device 1 in a schematic, partially sectional representation according to a first exemplary embodiment. The measuring and/or testing device 1 can particularly serve as a gage. Said measuring and/or testing device 1 can serve to determine positional tolerances such as coaxiality, axial run-out and angle of thread based on certain levels. Said measuring and/or testing device 1 of the invention is however also suitable for other applications.

The measuring and/or testing device 1 comprises a segmented thread 2, which is designed as external thread in this exemplary embodiment. The segmented thread 2 comprises thread segments 3, 4, 5, 6. In so doing, the thread segments 3, 5 are configured on a thread section of a guide tube 7. In order to manufacture the segmented external thread 2, in particular to cut said segmented thread 2, the guide tube 7 and the retaining body 8 are fixed in a certain position with respect to each other. The resulting thread 2 is configured as uniformly as possible. Specifically neither a conical design nor a design having pitch error is implemented.

The measuring and/or testing device 1 is partially screwed into a mating thread 10 of a work piece 11. The work piece 11 relates to a work piece 11 to be measured or tested. Specifically a coaxiality of the mating thread 10 can be tested with respect to a bore, an outside diameter, an axial run-out or the like. For this purpose, a backlash-free thread fixation of the measuring and/or testing device in the mating thread is initially required. This results from adjusting the retaining body 8 relative to the guide tube 7.

The retaining body 8 is adjustably guided in the guide tube 7 within certain limits. In this case, said retaining body 8 is guided in a guide bore 12, wherein the guidance can occur largely free from backlash. The guidance of said retaining body 8 in the guide bore 12 takes place along a longitudinal axis 13 of said guide bore 12. By adjusting said guide tube 7 relative to said retaining body 8, the two thread segments 4, 6 of said retaining body 8 are adjusted along the longitudinal axis 13 relative to the two other thread segments 3, 5 of said guide tube 7. In so doing, an axial clamping of the segmented thread 2 in the mating thread 10 results. In a manner of speaking, said segmented thread 2 is thereby somewhat divided. As a result, a play required for screwing in said segmented thread is eliminated. The corresponding lower and upper flanks 3 to 6 of said segmented thread 2 then rest on the lower and upper flanks of said mating thread 10. The axial position of the retaining body 8 is thereby fixed relative to the guide tube 7 and can be reproduced. As a result, a measurement system analysis and gage repeatability are achieved. The measuring and/or testing device 1 can particularly be locked in the same position when measuring or testing further mating thread 10.

The measuring and/or testing device 1 comprises a locking mechanism 15. The locking mechanism 15 includes a resilient element 16 configured as a spiral spring and an actuating ring 17. The actuating ring 17 is connected to the retaining body 8 and cannot be displaced along the longitudinal axis particularly with respect to said retaining body 8. The resilient element 16 is on the one hand supported on the end face 18 of the guide tube 7. On the other hand, said resilient element 16 is supported on the end face 19 of said actuating ring 17. The end faces 18, 19 face one another. Said resilient element 16 is disposed in the preloaded state between said end faces 18, 19. Because said resilient element 16 is supported at said retaining body 8 via said actuating ring 17, the preload force of said resilient element 16 acts on said retaining body 8 with respect to the guide tube 7. An adjustment force acts thereby on said retaining body 8 in one direction 20, whereas an adjustment force acts on said guide tube 7 in the opposite direction 21. The directions 20, 21 are thereby parallel to the longitudinal axis 13. The force required for locking the segmented thread 2 in the mating thread 10 is therefore applied by said resilient element 16. By operating said actuating ring 17 against the force of said resilient element 16, the somewhat divided segmented thread 2 can be moved back into the initial state so that backlash exists between the thread 2 and the mating thread 10. As a result, the measuring and/or testing device 1 can be screwed in or out or adjusted with respect to the work piece 11.

The retaining body 8 has a receiving bore 25, which serves as a receptacle for a measuring and/or testing element 26, which is depicted schematically and as an extract in FIG. 1. The measuring and/or testing element 26 can, for example, comprise a rocker. A modular design is thereby possible so that if need be a plurality of measuring and/or testing elements 26 can also be provided in order to adapt the measuring and/or testing device 1 to the respective size, function and testing task. An advantageous construction of a gage or the like is then possible.

Figure 2:
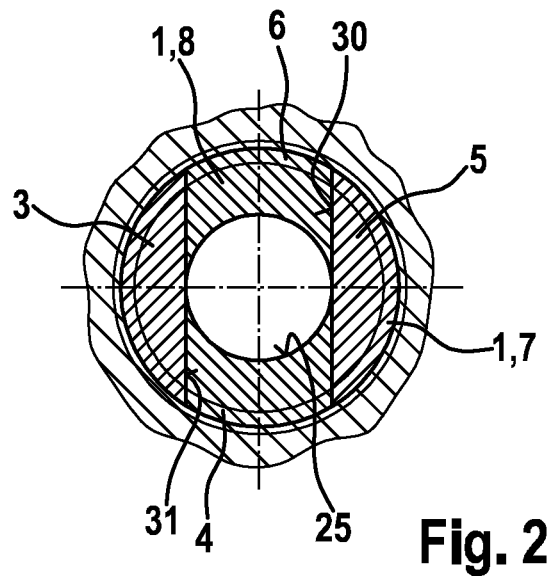
FIG. 2 a sectional view of the measuring and or testing device depicted in FIG. 1 along the cutting line denoted with || and FIG. 3 the section in FIG. 1 denoted with ||| of a measuring and or testing device according to a second exemplary embodiment of the invention.

FIG. 2 shows a sectional view of the measuring and/or testing device 1 depicted in FIG. 1 along the cutting line denoted with ||. The guide tube 7 has recesses 30, 31. The recesses 30, 31 are designed here in each case in the shape of a groove. The threaded segments 3, 5 of said guide tube 7 are thereby separated from one another. The thread segments 4, 6 of the retaining body 8 extend into said recesses 30, 31.

The segmented thread 2 along the longitudinal axis 13 can thus be somewhat divided and again put together by moving the retaining body 8 relative to the guide tube 7.

In this exemplary embodiment, provision is made for four thread segments 3, 4, 5, 6. The segmented thread 2 can however also be segmented in a different manner. The number of the thread segments is preferably 2, 4, 6 or 8.

Figure 3:
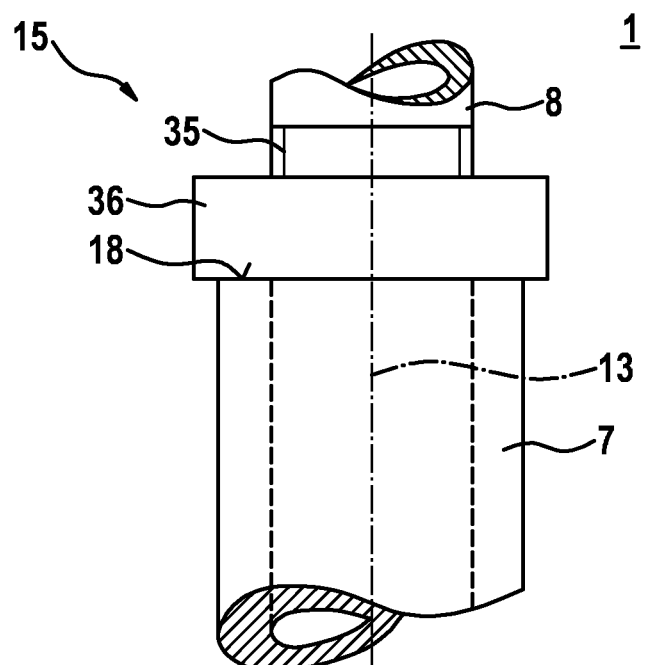

FIG. 3 shows the section of the measuring and/or testing device 1 denoted in FIG. 1 with ||| in accordance with a second exemplary embodiment. In this exemplary embodiment, an external thread 35 is fitted on the retaining body 8 in the region of the locking mechanism 15. Provision is furthermore made for a clamping nut 36, which acts together with the external thread 35 of said retaining body 8. The clamping nut 36 is supported in this case on the end face 18 of the guide tube 7. In this exemplary embodiment, the locking mechanism 15 comprises said clamping nut 36, which acts together with said external thread 35 in order to achieve a clamping of the thread segments 3 to 6 of the segmented thread. In this connection, a locking between said guide tube 7 and said retaining body 8 can be produced and again released by rotating said clamping nut 36 about the longitudinal axis 13.

The invention is not limited to the exemplary embodiments that have been described.

The invention claimed is:

1. A measuring or testing device (1) comprising a segmented thread (2), wherein the segmented thread (2) has a first thread segment (3) and at least a second thread segment (4) and wherein the first thread segment (3) and the second thread segment (4) are adjustable with respect to each other, wherein the first thread segment (3) and said second thread segment (4) can be adjusted under axial tension with respect to each other along a longitudinal axis (13) for the backlash-free thread fixation of the device (1) in the mating thread (10) of a work piece to be measured or tested, and wherein a guide tube (7) is provided, in that the first thread segment (3) is configured on the guide tube (7), in that a retaining body (8) is provided, which is guided in a guide bore (12) of the guide tube (7) along the longitudinal axis (13), and in that the second thread segment (4) is configured on the retaining body (8), and further wherein the guide tube (7) comprises at least one recess (30, 31) and at least one further thread segment (5), which is separated from the first thread segment (3) by the recess (30, 31), in that the retaining body (8) comprises at least one further thread segment (6) and in that the thread segments (4, 6) of said retaining body (8) are disposed in said recess (30, 31) of said guide tube (7).

2. The measuring or testing device according to claim 1, characterized in that the segmented thread (2) is a segmented external thread (2).

3. The measuring or testing device according to claim 2, characterized in that a guide tube (7) is provided, in that the first thread segment (3) is configured on the guide tube (7), in that a retaining body (8) is provided, which is guided in a guide bore (12) of the guide tube (7) along the longitudinal axis (13), and in that the second thread segment (4) is configured on the retaining body (8).

4. The measuring or testing device according to claim 1, characterized in that the thread segments (4, 6) of the retaining body (8) are disposed on a thread section of said retaining body (8), which extends into the recess (30, 31) of the guide tube (7).

5. The measuring or testing device according to claim 1, characterized in that a locking mechanism (15) is provided, which facilitates an adjustment of the first thread segment (3) relative to the second thread segment (4).

6. The measuring or testing device according to claim 5, characterized in that the locking mechanism (15) comprises a resilient element (16), which on the one hand is supported at least indirectly on the guide tube (7) and on the other hand is supported at least indirectly on the retaining body (8).

7. The measuring or testing device according to claim 6, characterized in that the resilient element (16) applies a preload force to the retaining body (8) with respect to the guide tube (7), said preload force acting at least approximately along a longitudinal axis (13).

8. The measuring or testing device according to claim 5, characterized in that the locking mechanism (15) comprises one of a clamping nut (36) and a clamping screw, which facilitates an adjustment of the first thread segment (3) relative to the second thread segment (4).

9. The measuring or testing device according to claim 8, characterized in that the retaining body (8) is provided with a clamping thread (35), which works together with a clamping nut (36), and in that said clamping nut (36) is supported on an end face (18) of the guide tube (7).

10. A measuring or testing device (1) comprising a segmented thread (2), wherein the segmented thread (2) has a first thread segment (3) and at least a second thread segment (4) and wherein the first thread segment (3) and the second thread segment (4) are adjustable with respect to each other, wherein the first thread segment (3) and said second thread segment (4) can be adjusted under axial tension with respect to each other along a longitudinal axis (13) for the backlash-free thread fixation of the device (1) in the mating thread (10) of a work piece to be measured or tested, and wherein a guide tube (7) is provided, in that the first thread segment (3) is configured on the guide tube (7), in that a retaining body (8) is provided, which is guided in a guide bore (12) of the guide tube (7) along the longitudinal axis (13), and in that the second thread segment (4) is configured on the retaining body (8), and further wherein the retaining tube (8) comprises a receiving bore (25), which serves as a receptacle for a measuring or testing element (26).

11. A measuring or testing device (1) comprising a segmented thread (2), wherein the segmented thread (2) has a first thread segment (3) and at least a second thread segment (4) and wherein the first thread segment (3) and the second thread segment (4) are adjustable with respect to each other, wherein the first thread segment (3) and said second thread segment (4) can be adjusted under axial tension with respect to each other along a longitudinal axis (13) for the backlash-free thread fixation of the device (1) in the mating thread (10) of a work piece to be measured or tested, wherein the segmented thread (2) is a segmented external thread (2), wherein a guide tube (7) is provided, in that the first thread segment (3) is configured on the guide tube (7), in that a retaining body (8) is provided, which is guided in a guide bore (12) of the guide tube (7) along the longitudinal axis (13), and in that the second thread segment (4) is configured on the retaining body (8), and further wherein the guide tube (7) comprises at least one recess (30, 31) and at least one further thread segment (5), which is separated from the first thread segment (3) by the recess (30, 31), in that the retaining body (8) comprises at least one further thread segment (6) and in that the thread segments (4, 6) of said retaining body (8) are disposed in said recess (30, 31) of said guide tube (7).

12. The measuring or testing device according to claim 1, characterized in that the thread segments (4, 6) of the retaining body (8) are disposed on a thread section of said retaining body (8), which extends into the recess (30, 31) of the guide tube (7).

13. The measuring or testing device according to claim 12, characterized in that a locking mechanism (15) is provided, which facilitates an adjustment of the first thread segment (3) relative to the second thread segment (4).

14. The measuring or testing device according to claim 13, characterized in that the locking mechanism (15) comprises a resilient element (16), which on the one hand is supported at least indirectly on the guide tube (7) and on the other hand is supported at least indirectly on the retaining body (8).

15. The measuring or testing device according to claim 14, characterized in that the resilient element (16) applies a preload force to the retaining body (8) with respect to the guide tube (7), said preload force acting at least approximately along a longitudinal axis (13).

16. The measuring or testing device according to claim 13, characterized in that the locking mechanism (15) comprises one of a clamping nut (36) and a clamping screw, which facilitates an adjustment of the first thread segment (3) relative to the second thread segment (4).

17. The measuring or testing device according to claim 16, characterized in that the retaining body (8) is provided with a clamping thread (35), which works together with a clamping nut (36), and in that said clamping nut (36) is supported on an end face (18) of the guide tube (7).

18. The measuring or testing device according to claim 17, characterized in that the retaining tube (8) comprises a receiving bore (25), which serves as a receptacle for a measuring or testing element (26).

\* \* \* \* \*